(12) United States Patent
Kawaguchi

(10) Patent No.: US 7,580,624 B2
(45) Date of Patent: Aug. 25, 2009

(54) POSITION DETECTING DEVICE AND LENS TUBE

(75) Inventor: Koji Kawaguchi, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 349 days.

(21) Appl. No.: 11/473,244

(22) Filed: Jun. 23, 2006

(65) Prior Publication Data

US 2007/0122136 A1     May 31, 2007

(30) Foreign Application Priority Data

Oct. 28, 2005    (JP)  ............... 2005-314618

(51) Int. Cl.
*G03B 17/00* (2006.01)
(52) U.S. Cl. ....................... 396/87; 348/347
(58) Field of Classification Search ............ 396/87; 348/347
See application file for complete search history.

(56) References Cited

U.S. PATENT DOCUMENTS 5,826,114 A * 10/1998 Miyamoto et al. ............ 396/55
6,169,578 B1 * 1/2001 Chigira ..................... 348/347
6,825,881 B1 * 11/2004 Fujii ........................ 348/335
2004/0212720 A1 * 10/2004 Kobayashi ................. 348/340

FOREIGN PATENT DOCUMENTS

| JP | 9-105850 | | 4/1997 |
| JP | 2003--287666 | * | 10/2003 |
| JP | 2003-287666 A | | 10/2003 |

OTHER PUBLICATIONS

JP Publication No. 2003-287666 translation; Azegami, Kazuyoshi; Lens Barrel of Camera; Oct. 10, 2003.*

* cited by examiner

*Primary Examiner*—Christopher E Mahoney
*Assistant Examiner*—Fang-Chi Chang
(74) *Attorney, Agent, or Firm*—Foley & Lardner LLP

(57) ABSTRACT

A lens tube includes a lens guiding frame, a main unit, and a position detecting device. The lens guiding frame holds a zoom lens. The main unit holds the lens guiding frame to be movable in a direction of an optical axis with the zoom lens. The position detecting device detects a position of the zoom lens held in the main unit. The position detecting device includes an optical sensor and a detection target member. The detection target member includes a sensor cut unit and a sensor cover unit. The sensor cut unit is detected by the optical sensor. The sensor cover unit covers the optical sensor and the sensor cut unit during the detection.

6 Claims, 11 Drawing Sheets

POSITION DETECTING DEVICE AND LENS TUBE

BACKGROUND OF THE INVENTION

1. Field of the Invention

The present invention relates to a technology for detecting a position of a lens in optical devices.

2. Description of the Related Art

Conventionally, lens tubes in which a variable magnification lens, such as a zoom lens, is arranged adjust magnification by moving the lens in a direction of an optical axis. In recent years, the lens tubes have become increasingly complex due to advances in performance of an optical system. For example, as the magnifications in the variable magnification become increasingly high, the number of lenses and parts housed in the lens tube increases. On the other hand, with a demand for compact-sized devices in the market of surveillance cameras and digital cameras, miniaturization of the lens tubes used in these cameras is demanded.

To miniaturize the lens tube in response to such demands, a lens tube having the following configuration, for example, is provided. The lens tube is configured to include a driving device, such as a motor, that performs a driving operation to move the lens. In such lens tubes, for example, a detection-target unit is attached to a lens guide frame to accurately move the lens using the driving device. The detection-target unit, such as a blocking plate, is used to perform position detection of the lens. In the position detection, the detection-target unit attached to the lens guide frame is detected by a sensor. Thus, a position of the lens is detected when the lens is moved (for example, Japanese Patent Laid-open Publication No. H9-105850).

In the conventional technology described above, an optical sensor is used as the sensor. Incident light to the lens tube may enter the sensor, directly, or indirectly due to diffusion inside the lens tube. As a result, erroneous detection occurs, and a position of the lens is erroneously detected at an unintended position in the lens tube. Thus, malfunction of the lens tube may occur.

SUMMARY OF THE INVENTION

It is an object of the present invention to at least solve the above problems.

A position detecting device according to one aspect of the present invention detects a position of a frame that holds a lens in a lens tube. The position detecting device includes an optical sensor unit arranged on any one of the lens tube and the frame; and a detection target unit arranged on either one of the lens tube and the frame on which the detection target unit is not arranged. The detection target is to be detected by the optical sensor unit. The detection target unit includes a target member detected by the optical sensor unit; and a shielding unit configured to cover the optical sensor unit and the detection target member at a time of detection.

A lens tube according to another aspect of the present invention includes a frame configured to hold a lens; a lens tube configured to hold the lens and the frame movably in a direction of an optical axis; and a detecting unit configured to detect a position of the frame in the direction of the optical axis. The detecting unit includes an optical sensor unit arranged on any one of the lens tube and the frame; and a detection target unit arranged on either one of the lens tube and the frame on which the detection target unit is not arranged. The detection target is to be detected by the optical sensor unit, and includes a target member detected by the optical sensor unit; and a shielding unit configured to cover the optical sensor unit and the detection target member at a time of detection.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
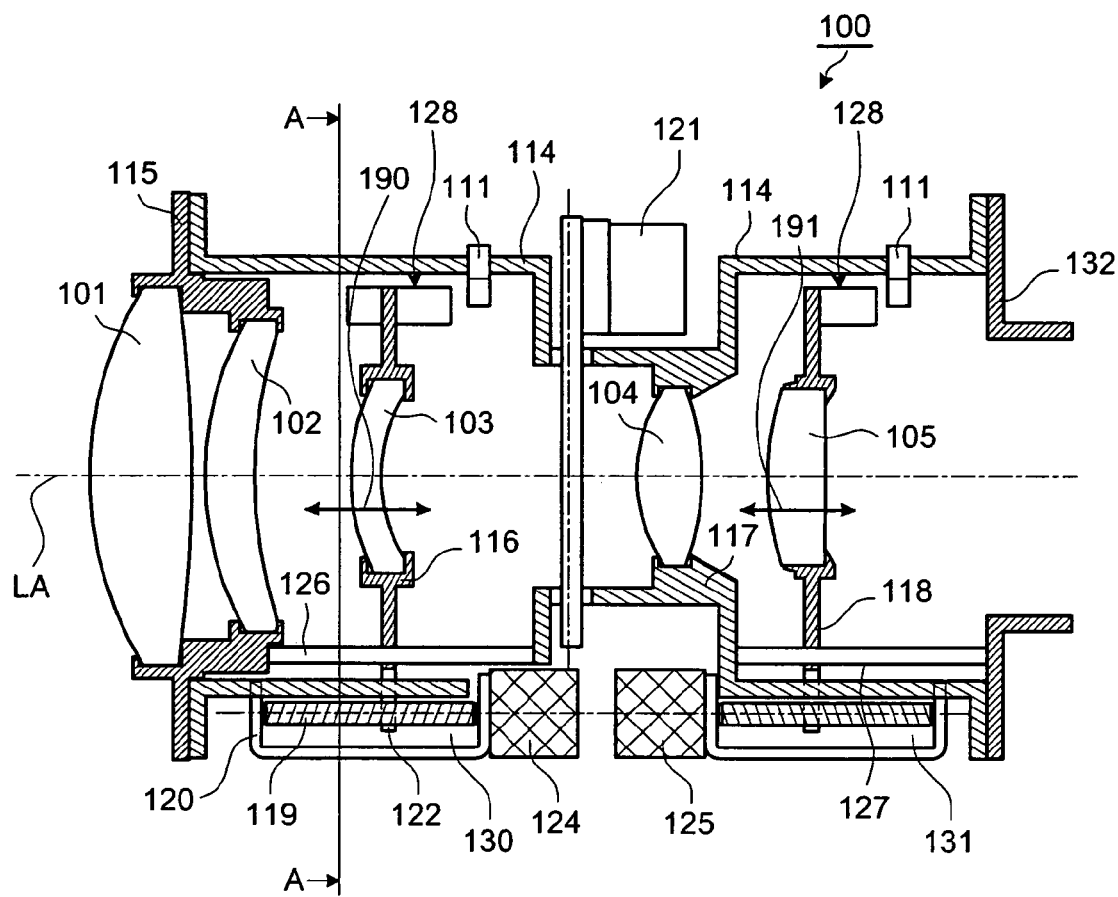
FIG. 1 is a cross-section of a lens tube including a position detecting device according to an embodiment of the present invention.

Exemplary embodiments according to the present invention will be explained in detail with reference to the accompanying drawings. FIG. 1 is a cross-section of a lens tube including a position detection device according to an embodiment of the present invention. The embodiment is explained assuming that an object (not shown) is present on a left-hand side in FIG. 1 and a main body of a camera (not shown) is present on a right-hand side in FIG. 1.

A lens tube 100 includes a main unit 114 of a lens tube, fixed lenses 101 and 102, a zoom lens 103, a fixed lens 104, a focus lens 105, an aperture unit 121, and optical sensors 111. The main unit 114 is a fixed tube. The fixed lenses 101 and 102, the zoom lens 103, and the fixed lens 104 are sequentially disposed in the main unit 114, in a direction of an optical axis LA from the object. The focus lens 105 is disposed on a camera side with respect to the fixed lenses 101, 102, and 104, and the zoom lens 103 in the direction of the optical axis LA. The aperture unit 121 adjusts an amount of incident light that passes through the lenses 101 to 105 in the main unit 114 from an external source. The optical sensors 111 perform position detection of the zoom lens 103 and the focus lens 105. The lens tube 100 is attached to the main body of the camera by, for example, a mount 132.

The fixed lenses 101 and 102 are fixed and held in the main unit 114 by a fixed lens holding frame 115. The zoom lens 103 is held movably in the direction of the optical axis LA in the main unit 114 by a lens guiding frame 116. The fixed lens 104 is fixed and held in the main unit 114 by a lens holding unit 117, formed on the main unit 114. The focus lens 105 is held movable in the direction of the optical axis LA, in the main unit 114 by a focus lens moving frame 118, as is the zoom lens 103.

A detection target member 128 is a detection object of the sensor. The detection target member 128 is provided in a position corresponding to a position of the optical sensor 111 within the outer perimeters of the lens guiding frame 116 and the focus lens moving frame 118. A position detecting unit includes the optical sensor 111 and the detection target member 128.

The zoom lens 103 forms an optical system that changes a focal distance or magnification without changing a distance between the object and an image (not shown). The focus lens 105 composes an optical system that focuses on the object. In the embodiment, the zoom lens 103 moves back and forth in the direction of the optical axis LA indicated by an arrow 190 shown in FIG. 1, thereby allowing a size of an image imaged in the camera to be changed. Furthermore, the object can be focused by the focus lens 105 being moved back and forth in the direction of the optical axis LA indicated by an arrow 191 shown in FIG. 1.

A driving unit 130 and a driving unit 131 drives the lens guiding frame 116 and the focus lens moving frame 118. The driving unit 130 includes a driving motor 124, a driving axis 119, a connecting unit 122, and a blanket 120. The driving motor 124 generates a driving force used to move the lens guiding frame 116. The driving axis 119 is connected to the driving motor 124 and transfers the driving force. The connecting unit 122 connects the driving axis 119 and the lens guiding frame 116. The blanket 120 shields the driving axis 119 and the connecting unit 122 from the outside.

One edge of the blanket 120 on an object side (front side) in the direction of the optical axis LA is fixed to the main unit 114. The other edge of the blanket 120 on the camera side (rear side) in the direction of the optical axis LA is fixed to the driving motor 124. The driving axis 119 is rotatably supported by the blanket 120 at both ends so that the driving axis 119 makes a rotation about an axis thereof. In addition, the end of the driving axis 119 on the rear side of the blanket 120 is connected to an axis (not shown) of the driving motor 124.

The connecting unit 122 is supported by the driving axis 119 so as to slide freely and moves back and forth in the direction of the optical axis LA according to an amount of rotation of the driving axis 119. Therefore, when the driving motor 124 is operated and the driving axis 119 is rotated, the connecting unit 122 can be moved back and forth according to the amount of rotation by the driving axis 119.

The lens guiding frame 116 is integrally supported by the connecting unit 122. Therefore, when the driving motor 124 is operated and the driving axis 119 is rotated, the zoom lens 103 held in the lens guiding frame 116 moves back and forth with the connecting unit 122 in the direction of the optical axis LA, as indicated by the arrow 190, according to the amount of rotation by the driving axis 119.

Although the driving unit 130 and the lens guiding frame 116 are given as examples, a configuration of the driving unit 131 and an operation, in which the focus lens moving frame 118 moves back and forth in the direction of the optical axis LA by the driving operation of the driving unit 131, are the same. Therefore, explanations are omitted.

A motor cover (not shown) may be provided on front surfaces of the driving motors 124 and 125 to prevent reflection of light incident on the driving motors 124 and 125. The motor cover is formed with a resin material, such as thermosetting resin. However, shape, material, etc. of the cover are not limited as long as the motor cover functions to prevent the reflection.

It is preferable to form the motor cover with a resin material because it is superior in terms of molding precision, manufacturing costs, weight, corrosion-resistance, and the like, compared to when the motor cover is formed with a metallic material. If a front surface of the motor cover is colored black by a processing such as staining, the reflection of light such as incident light on the front surface of the motor cover can be effectively prevented.

A guide ball 126 and a guide ball 127, shown in FIG. 1, guide a back-and-forth movement of the lens guiding frame 116 and the focus lens moving frame 118 in the directions indicated by the arrow 190 and the arrow 191. The guide ball 126 and the guide ball 127 also restrict movement related to the back-and-forth movement. Therefore, the guide ball 126 and the guide ball 127 allow the lens guiding frame 116 and the focus lens moving frame 118 to move back and forth in the directions indicated by the arrow 190 and the arrow 191 with further smoothness and directness.

Figure 2:
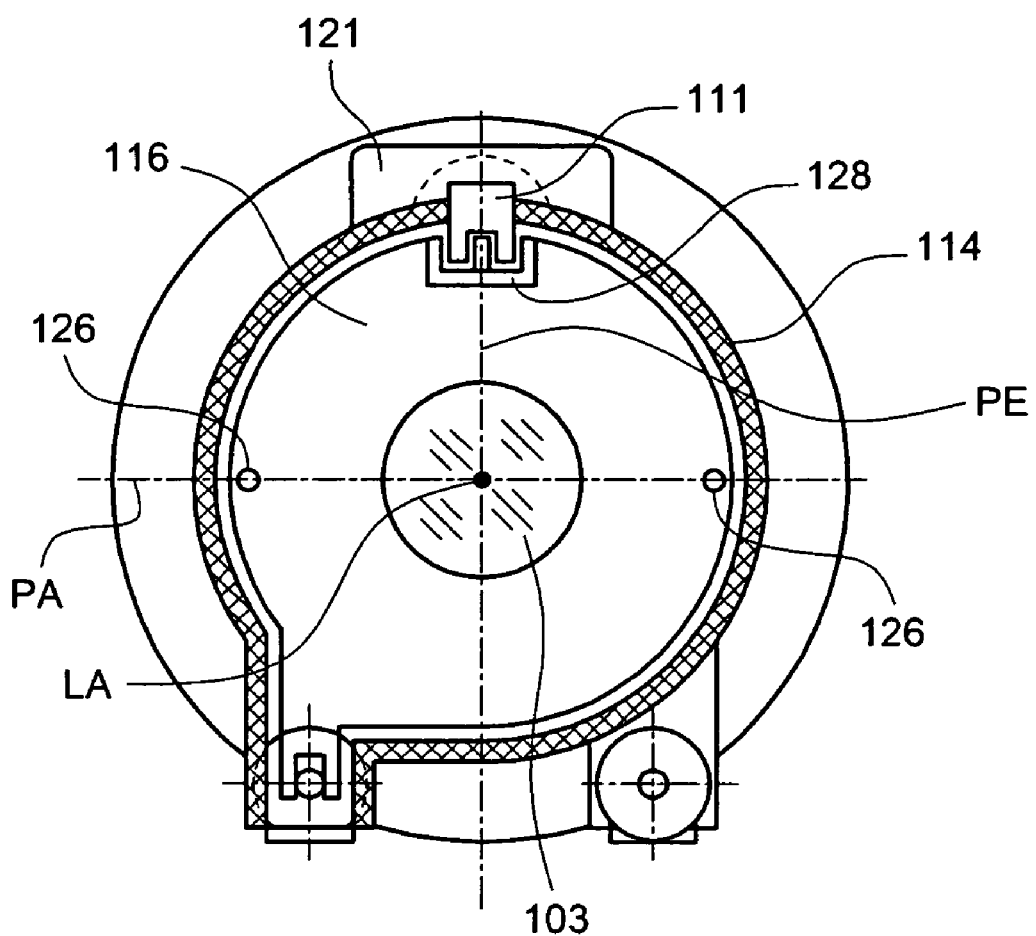
FIG. 2 is a cross-section of the lens tube taken along a line A-A shown in FIG. 1.

FIG. 2 is a cross-section of the lens tube taken along a line A-A shown in FIG. 1. Components that are the same as the components described above are given the same reference numbers, and explanations thereof are omitted. In the center area of the main unit 114, the zoom lens 103 is held by the lens guiding frame 116. The optical sensors 111 are attached to an upper area of the main unit 114 in a vertical direction PE that is perpendicular to the optical axis LA. The optical sensors 111 are an optical sensor unit. The detection target member 128 is the detection-object for the sensor. The detection target member 128 is provided in a position corresponding to a position of the optical sensor 111, on an outer perimeter of the lens guiding frame 116.

The position detecting unit includes the optical sensor 111 and the detection target member 128. The guide ball 126 penetrates an engaging hole (not shown) formed on the lens guiding frame 116 in a horizontal direction PA that is perpendicular to the optical axis LA, thereby connecting the lens guiding frame 116 and the guiding ball 126 to allow sliding.

The aperture unit 121 is provided in a position behind the optical sensor 111 as shown in FIG. 2 (a position between the optical sensors 111 as shown in FIG. 1). The aperture unit 121 includes aperture blades (not shown) that overlap with each other so as to form a circular opening in substantially a center. The lens tube 100 is required to adjust an amount of light entering the main unit 114 depending on the brightness of the object.

For example, when the object is bright, the amount of light entering the main unit 114 is reduced. When the object is dark, the amount of light entering the main unit 114 is increased. The aperture unit 121 adjusts the amount of light that passes through the lenses in the main unit 114 from the outside, by changing an opening area of the opening formed with the aperture blades.

Figure 3:
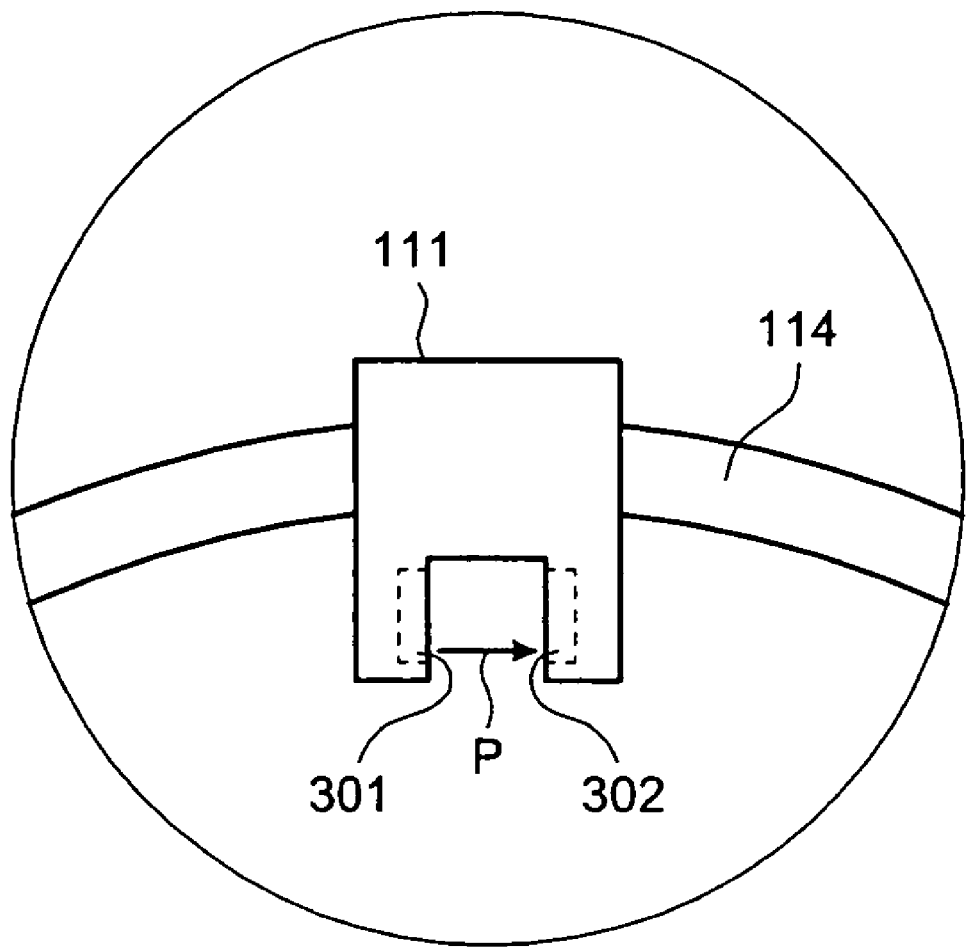
FIG. 3 is an enlarged view of an optical sensor.

FIG. 3 is an enlarged view of the optical sensor. The optical sensor 111 has a substantially U-shaped cross-section in a direction perpendicular to the optical axis LA (see FIG. 1 and FIG. 2). The optical sensor 111 is attached to the main unit 114. A sensor light emitting unit 301 and a sensor light receiving unit 302 are disposed in the optical sensor 111, within opposing walls in a groove area of the U-shape. The sensor light emitting unit 301 and the sensor light receiving unit 302 are disposed facing each other, so that respective light emitting surface and light receiving surface are exposed on the surfaces of the walls. The sensor light emitting unit 301 includes, for example, a light emitting diode (LED) and emits light, such as infrared rays.

The sensor light receiving unit 302 includes, for example, a phototransistor. The sensor light receiving unit 302 receives light through the light receiving surface (not shown) and sends an electric current through the optical sensor 111, depending on intensity of the received light. In FIG. 3, the sensor light emitting unit 301 emits light in a direction indicated by an arrow P. Then, the sensor light receiving unit 302 receives the light emitted from the sensor light emitting unit 301 and sends the electric current through the optical sensor 111, according to the intensity of the received light.

If an obstacle passes between the sensor light emitting unit 301 and the sensor light receiving unit 302 of the optical sensor 111, the obstacle prevents the sensor light receiving unit 302 from receiving the light emitted from the sensor light emitting unit 301. Therefore, the electric current does not flow into the optical sensor 111. Through detection of ON and OFF of the electric current flowing through the optical sensor 111 in this way, the optical sensor 111 detects a presence of the obstacle passing between the sensor light emitting unit 301 and the sensor light receiving unit 302.

According to the embodiment of the invention, the lens guiding frame 116 moves back and forth in the direction of the optical axis LA indicated by the arrow 190, as explained above. Furthermore, the lens guiding frame 116 has the detection target member 128 in the position corresponding to a position of the optical sensor 111 in the main unit 114, as explained above.

Therefore, for example, in FIG. 1, if the lens guiding frame 116 moves to the optical sensor 111 side in the direction of the optical axis LA until the lens guiding frame reaches a position overlapping with the optical sensor 111, side walls 402a and 402b of a sensor cover 402 of the detection target member 128 provided in the lens guiding frame, covers an outer side of the optical sensor 111. In addition, a sensor cut unit 401, described hereafter, passes between the sensor light emitting unit 301 and the sensor light receiving unit 302 to block the sensor light emitting unit 301 and the sensor light receiving unit 302.

Figure 4:
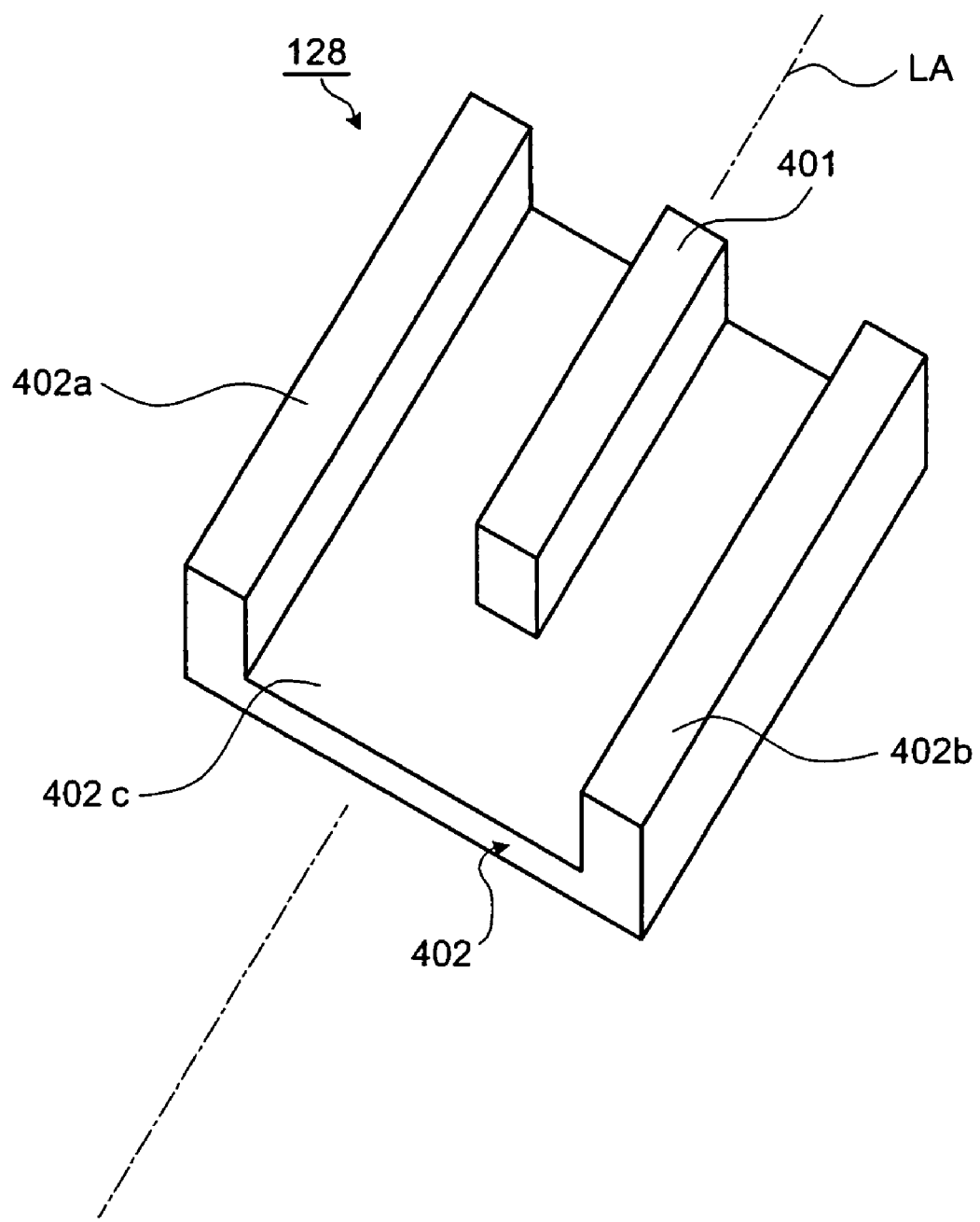
FIG. 4 is a perspective view of a detection target member.
Figure 5:
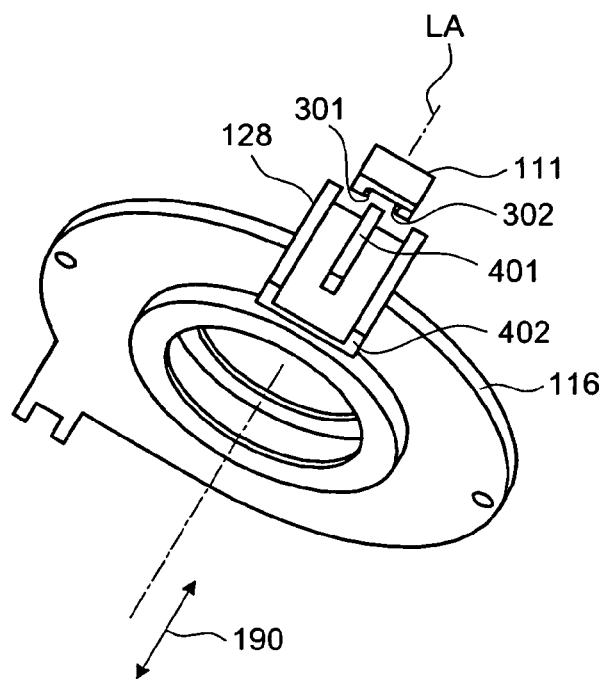
FIG. 5 is a perspective view of the position detecting device according to the embodiment.

The detection target member 128 will be explained. FIG. 4 is an enlarged perspective view of an example of the detection target member. FIG. 5 is a perspective view of an example of the position detecting device used in the lens tube according to the embodiment of the invention. The detection target member 128 provided in the lens guiding frame 116 (see FIG. 1) includes the sensor cut unit 401 and the sensor cover 402. The sensor cut unit 401 is a detection-object body. The sensor cover 402 is a light shielding unit.

The sensor cut unit 401 is formed with a rectangular board-shaped component, such as a protrusion, along the optical axis LA. The sensor cover 402 is formed along the optical axis LA near the sensor cut unit 401 to cover the outer side of the optical sensor 111 during position detection. The sensor cover 402 includes a pair of side walls 402a and 402b, and a bottom wall 402c. The side walls 402a and 402b are aligned facing each other in a direction perpendicular to the optical axis LA, sandwiching the sensor cut unit 401. The bottom wall 402c connects the side walls 402a and 402b and is provided on a base-end side of the sensor cut unit 401 in a direction towards the optical axis LA.

Therefore, when a cross-section of the detection target member 128 is viewed in the direction perpendicular to the optical axis LA in the sensor cut unit 401 formation area, the sensor unit 401 and the sensor cover 402 form, for example, a rough mound-shape. For example, the detection target member 128 is formed integrally, so that a base-end of the sensor cut unit 401 is connected to the bottom wall 402c, as explained above, in a center of the bottom wall 402c between the side walls 402a and 402b.

The detection target member 128 is provided on the outer perimeter of the lens guiding frame 116, as shown in FIG. 5, and moves back and forth with the lens guiding frame 116 in the direction of the optical axis LA indicated by the arrow 190. When the lens guiding frame 116 moves overlapping with the optical sensor 111, the sensor cut unit 401 passes between the sensor light emitting unit 301 and the sensor light receiving unit 302 of the optical sensor 111.

When the sensor cut unit 401 passes between the sensor light emitting unit 301 and the sensor light receiving unit 302 of the optical sensor 111, the sensor cut unit 401 gradually blocks the light emitted from the sensor light emitting unit 301. When the lens guiding frame 116 and the optical sensor 111 completely overlap, the light emitted from the sensor light emitting unit 301 is completely blocked and the sensor light receiving unit 302 does not receive light.

As described above, when the lens guiding frame 116 moves, overlapping with the optical sensor 111, the sensor cut unit 401 gradually blocks the light emitted from the sensor light emitting unit 301, thereby changing the amount of light received by the sensor light receiving unit 302. The sensor light receiving unit 302 sends the electric current into the optical sensor 111 depending on the amount of light received. Then, the optical sensor 111 detects the position of the zoom lens 103 by the size of the electric current flowing through the optical sensor 111.

The detection target member 128 is positioned between the sensor light emitting unit 301 and the sensor light receiving unit 302 of the optical sensor 111. The lens guiding frame 116 is in a position in the main unit 114 that is considered a home position (positioned at the home position) when the light emitted from the sensor light emitting unit 301 is completely blocked by the sensor cut unit 401. In other words, the zoom lens 103 is positioned at the home position when the lens guiding frame 116 is positioned at the home position, and the focal distance to the object and the magnification are changed based on the position of the home position.

Figure 6:
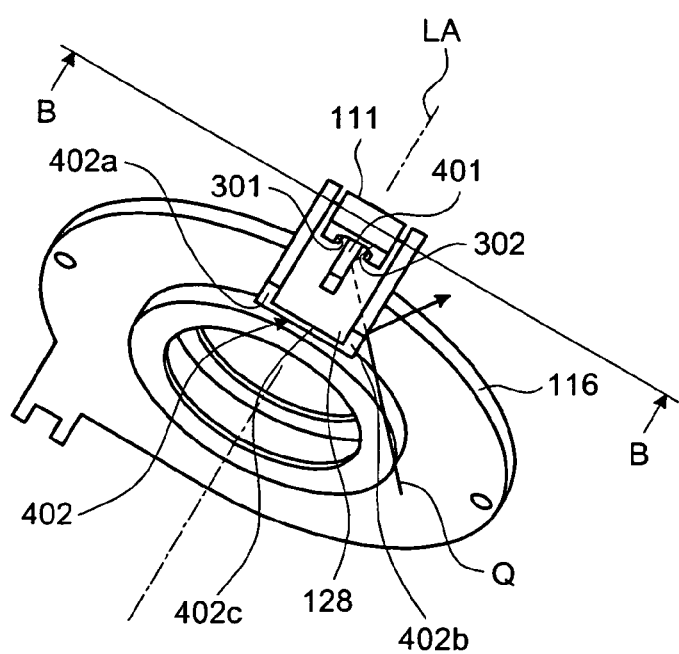
FIG. 6 is a perspective view a lens guiding frame at a home position.
Figure 7:
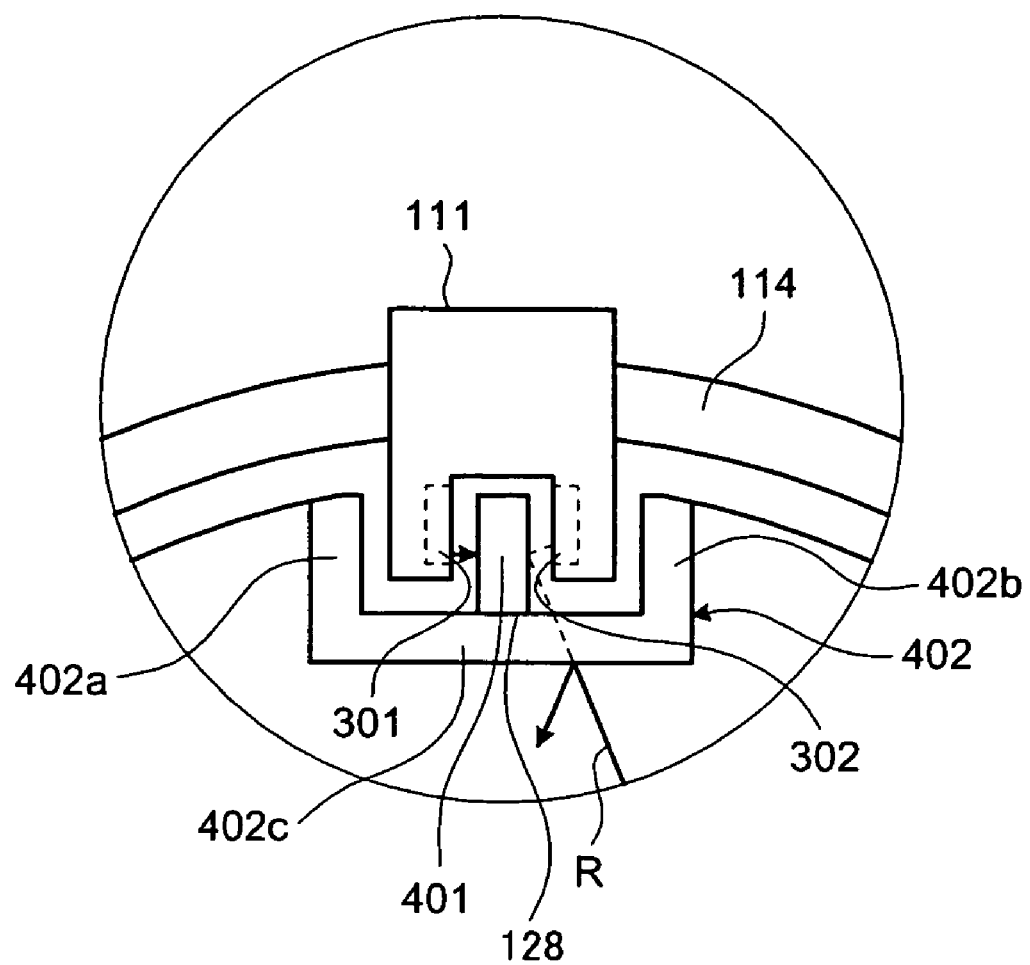
FIG. 7 is a cross-section of the lens guiding frame taken along a line B-B shown in FIG. 6.

FIG. 6 is a perspective view of the lens guiding frame positioned at the home position. FIG. 7 is a cross-section of the optical sensor taken along a line B-B shown in FIG. 6. When the lens guiding frame 116 is positioned at the home position, the sensor cut unit 401 of the detection target member 128 is positioned between the sensor light emitting unit 301 and the sensor light receiving unit 302 of the optical sensor 111. The sensor cut unit 401 completely blocks the light emitted from the sensor light emitting unit 301 to the sensor light receiving unit 302.

At this time, the sensor light receiving unit 302 does not receive the light emitted from the sensor light emitting unit 301 at all. Therefore, the electric current does not flow through the optical sensor 111, and the flow of electric current is in an OFF state. The optical sensor 111, for example, detects the home position of the zoom lens 103, held in the lens guiding frame 116, by detecting this OFF state.

When the lens guiding frame 116 is positioned at the home position, outer sides of the sensor light emitting unit 301 and the sensor light receiving unit 302 of the optical sensor 111 are covered in the direction perpendicular to the optical axis LA, by the side walls 402a, 402b, and the bottom wall 402c of the sensor cover 402. Therefore, an extraneous light, particularly from the direction perpendicular to the optical axis LA, can be prevented from being incident on the sensor light receiving unit 302 of the optical sensor 111. For example, the extraneous light to the optical sensor 111 from a lower direction, as indicated by an arrow R shown in FIG. 7, is reflected by the bottom wall 402c of the sensor cover 402. Therefore, the extraneous light is not incident on the sensor light receiving unit 302 of the optical sensor 111.

Furthermore, extraneous lights to the optical sensor 111 from a front direction at an angle, as indicated by an arrow Q shown in FIG. 6, and from a roughly lateral direction, are reflected by the side walls 402a and 402b of the sensor cover 402. Therefore, the extraneous light is not incident on the sensor light receiving unit 302 of the optical sensor 111. As a result, when detecting the home position of the zoom lens 103, an erroneous detection by the optical sensor 111 that occurs when the sensor light receiving unit 302 receives the extraneous light can be prevented.

The optical sensor 111 and the detection target member 128 can be formed with a light-absorbing material. In this case, the optical sensor 111 and the detection target member 128 can, for example, be formed with a light-absorbing resin. Alternatively, the surfaces of the optical sensor 111 and the detection target member 128 can, for example, be colored black.

In addition, for example, when the sensor light emitting unit 301 and the sensor light receiving unit 302 are provided so that the respective light emitting surface and light receiving surface are not exposed within the opposing walls in the groove area, the light emitting surface of the sensor light emitting unit 301 and the light receiving surface of the sensor light receiving unit 302 are disposed facing each other through emission holes and incident holes formed on the walls. Therefore, influence from the extraneous light can be suppressed with further effectiveness by changes made to the shapes, materials, and the like of the emission holes and the incident holes, accordingly.

As a result, the extraneous light incident on the sensor light receiving unit 302 of the optical sensor 111 can be reduced. In addition, the light emitted from the sensor light emitting unit 301 in the home position can be prevented from being reflected on a front surface of the walls in the groove area of the optical sensor 111 and a front surface of the detection target member 128 and being incident on the sensor light receiving unit 302. Therefore, the erroneous detection of the home position can be further reduced.

Although the home position detection of the zoom lens 103 is explained, the home point position of the focus lens 105 shown in FIG. 1 can also be detected in a similar manner. Therefore, an explanation thereof is omitted. The shape of the detection target member 128 is not limited, as long as the extraneous light and the like are not incident on the sensor light receiving unit 302 when the lens guiding frame 116 is in the home position.

Figure 8:
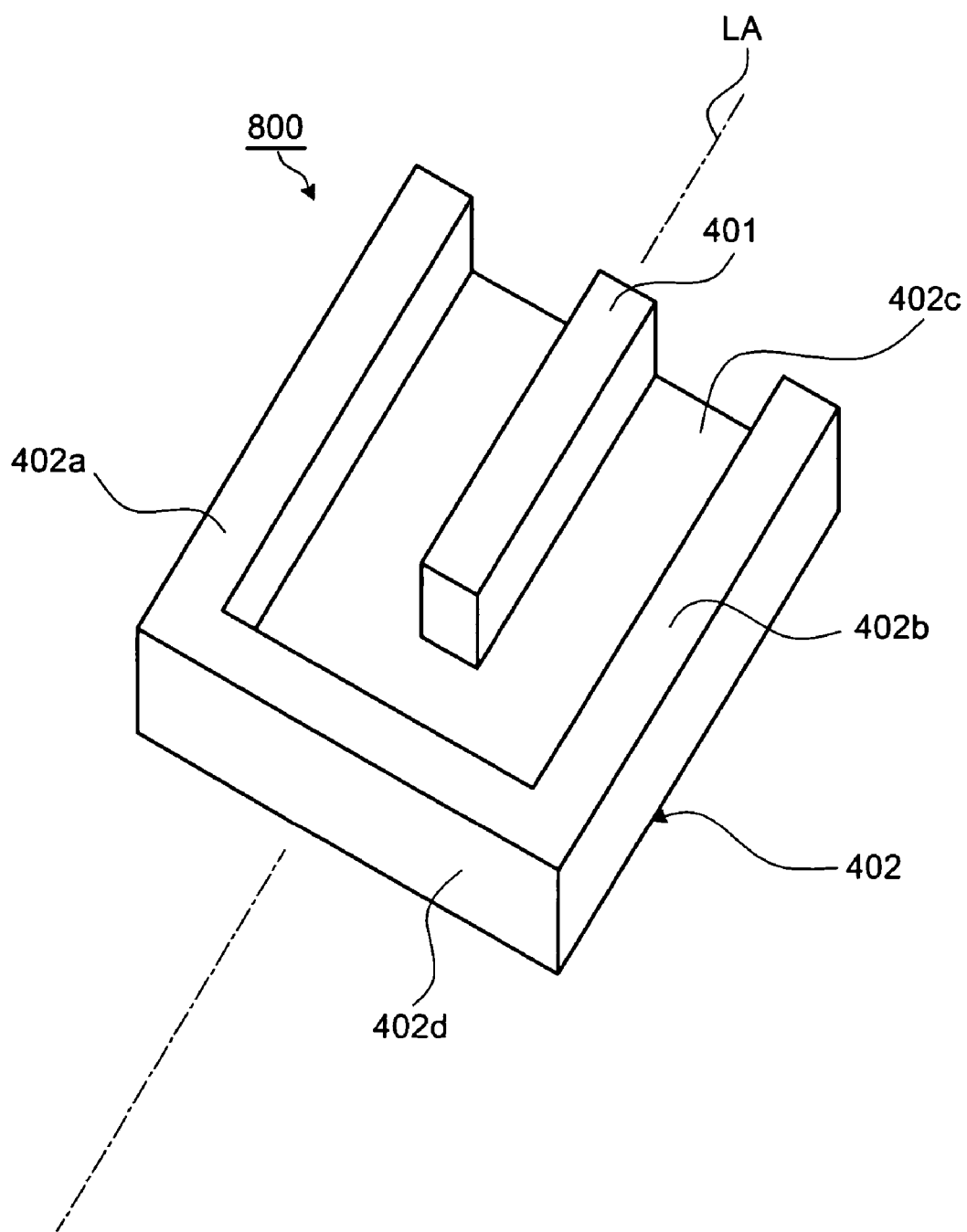
FIG. 8 is a perspective view of a detection target member.

FIG. 8 illustrates another example of the detection target member. A detection target member 800 further includes a front wall 402d in the detection target member 128 shown in FIG. 4. The front wall 402d connects the edges of the side walls 402a and 402b, and the bottom wall 402c that are on the front side in the direction of the optical axis LA.

Figure 9:
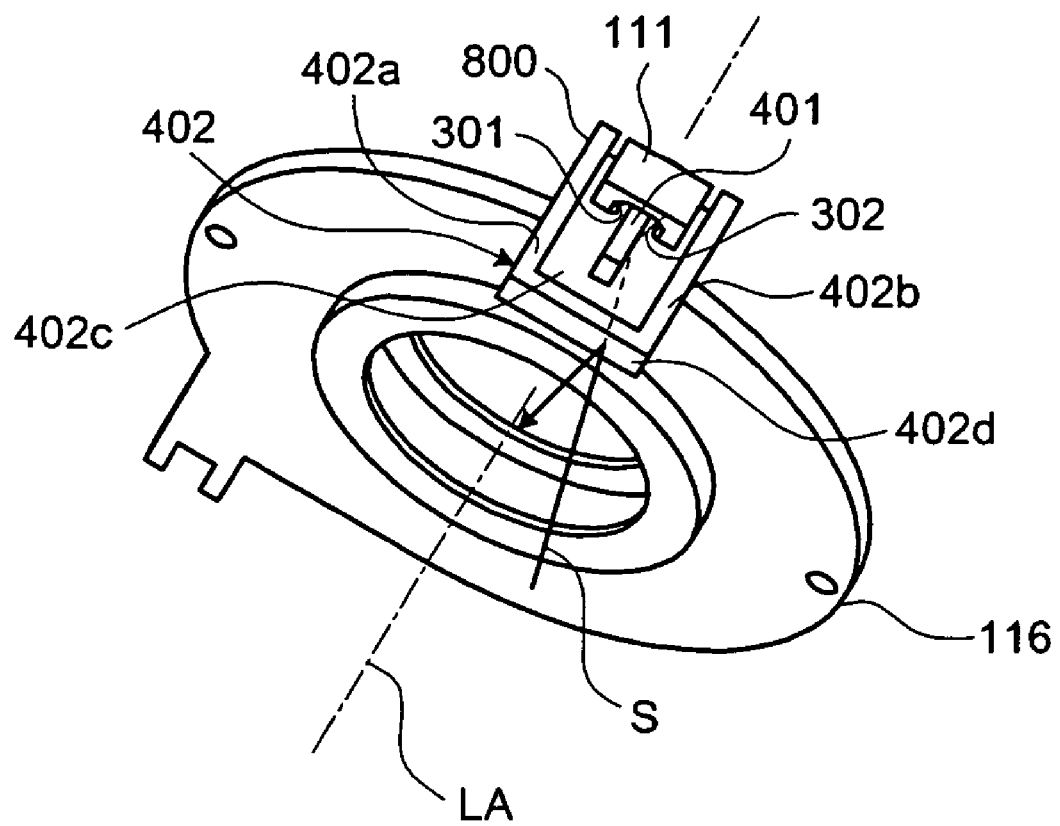
FIG. 9 is a perspective view a lens guiding frame at a home position.

FIG. 9 illustrates another example of the lens guiding frame positioned at the home position. When the lens guiding frame 116 is positioned at the home position, the outer sides of the sensor light emitting unit 301 and the sensor light receiving unit 302 are covered by the side walls 402a and 402b, the bottom wall 402c, and the front wall 402d of the sensor cover 402 of the detection target member 800. At this time, for example, the extraneous light from the front in the direction of the optical axis LA, as indicated by an arrow S, is reflected by the front wall 402d. Therefore, the extraneous lights from the front direction, the front direction at an angle, the lower direction, and the lateral direction are not incident on the sensor light receiving unit 302 of the optical sensor 111. As a result, when detecting the home position of the zoom lens 103, the extraneous light can be further effectively prevented from being incident on the sensor light receiving unit 302 and erroneous detection can be prevented with further certainty.

Figure 10:
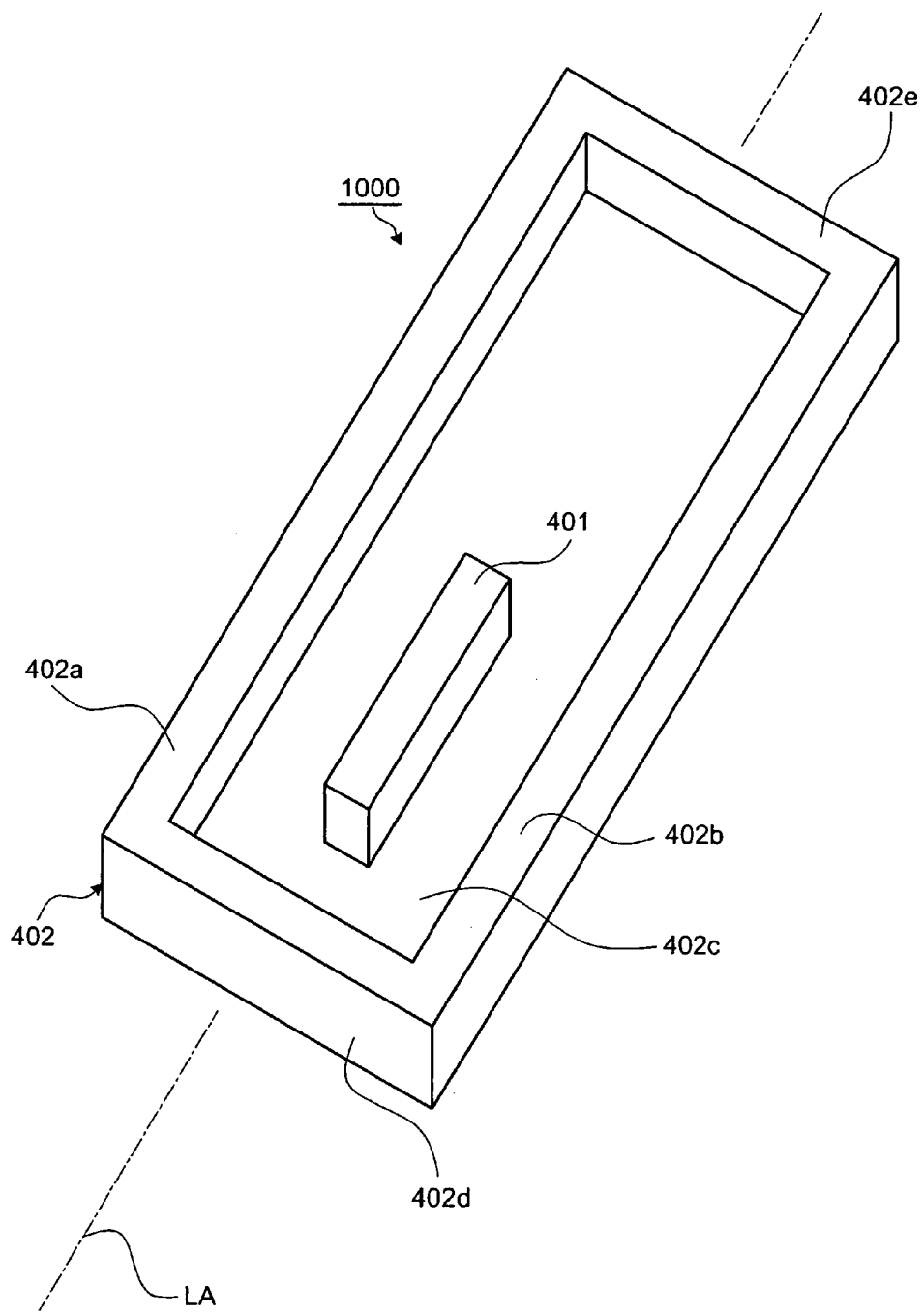
FIG. 10 is a perspective view of a detection target member.

FIG. 10 illustrates still another example of the detection target member. A detection target member 1000 further includes a rear wall 402e in the detection target member 800 shown in FIG. 8. The rear wall 402e connects the edges of the side walls 402a and 402b, and the bottom wall 402c that are on the rear side in the direction of the optical axis LA. At this time, a range of movement of the lens guiding frame 116 (see FIG. 1) in relation to the optical sensor 111 is considered. The side walls 402a and 402b, and the bottom wall 402c of the sensor cover 402 are further extended in the direction of the optical axis LA to prevent the front wall 402d and the rear wall 402e from interfering with the optical sensor 111 and restricting the range of movement of the lens guiding frame 116.

Figure 11:
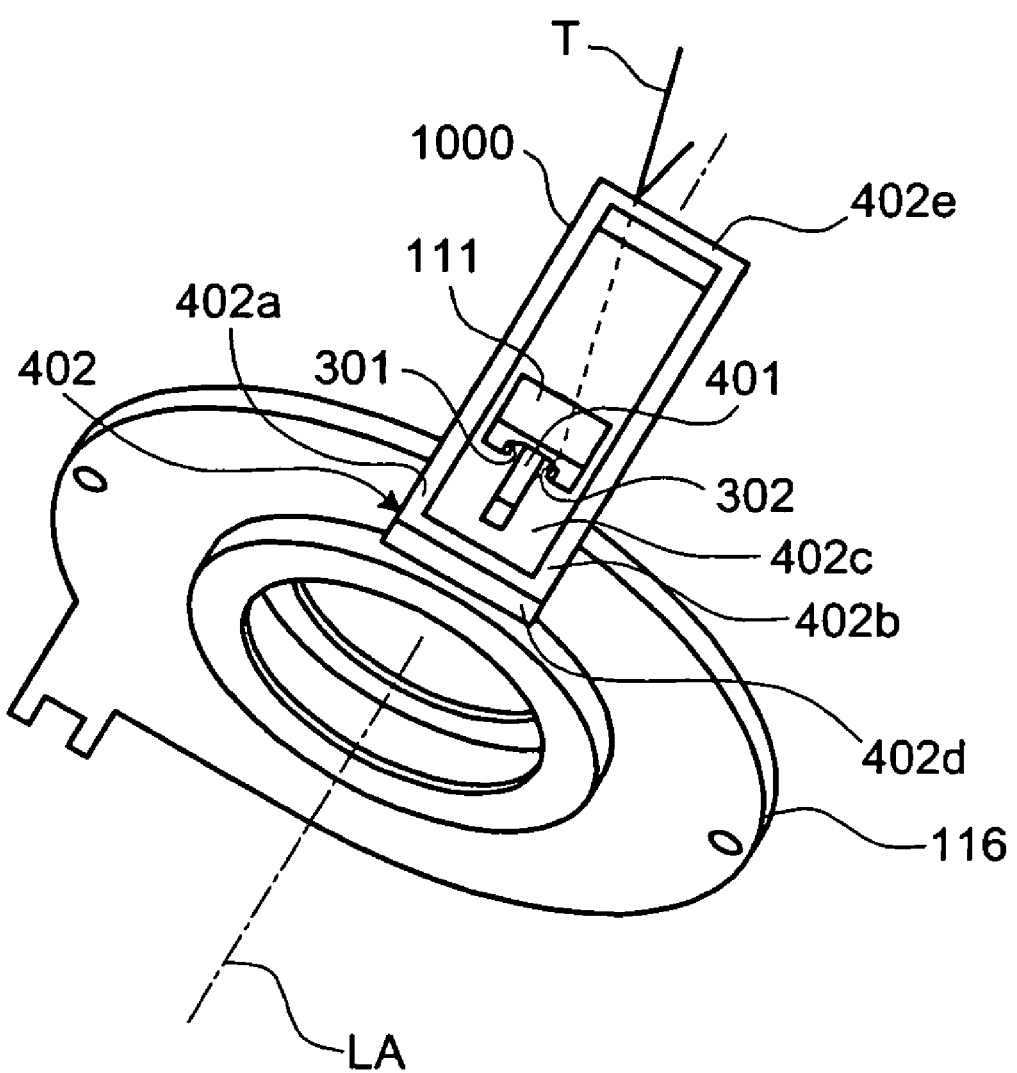
FIG. 11 is a perspective view a lens guiding frame at a home position.

FIG. 11 illustrates still another example of the lens guiding frame positioned at the home position. When the lens guiding frame 116 is positioned at the home position, the sensor light emitting unit 301 and the sensor light receiving unit 302 are covered by the side walls 402a and 402b, the bottom wall 402c, the front wall 402d, and the rear wall 402e of the sensor cover 402 of the detection target member 1000. At this time, for example, the extraneous light from the back in the direction of the optical axis LA, as indicated in the diagram by an arrow T, is reflected by the rear wall 402e. Therefore, the extraneous lights from all directions in the periphery of the optical sensor 111 are not incident on the sensor light receiving unit 302 of the optical sensor 111. As a result, when detecting the home position of the lens guiding frame 116, the extraneous light can be further effectively prevented from being incident on the sensor light receiving unit 302 and erroneous detection can be prevented with further certainty.

Although the front wall 402d in FIG. 8 and the rear wall 402e in FIG. 10 are formed separately from the sensor cover 402 and subsequently connected, the front wall 402d and the rear wall 402e can be integrally molded. For example, when the front wall 402d and the rear wall 402e are formed by integral molding, a number of manufacturing procedures can be reduced, thereby simplifying operations and reducing costs.

Although the optical sensor 111 is attached to the main unit 114 and the detection target member 128 is provided in the lens guiding frame 116 according to the embodiment of the invention, an opposite configuration is also possible. In other words, the detection target member 128 can be provided in the main unit 114 and the optical sensor 111 can be attached to the lens guiding frame 116.

Although the optical sensor 111 is disposed outside of an outer diameter of the lens guiding frame 116 (outer peripheral edge), as shown in FIG. 2, the following configuration is also possible. The optical sensor 111 and the detection target member 128 are disposed to be positioned within the outer peripheral edge of the lens guiding frame 116 only in the direction towards the optical axis LA, on a plane perpendicular to the optical axis LA of the lens guiding frame 116.

Figure 12A:
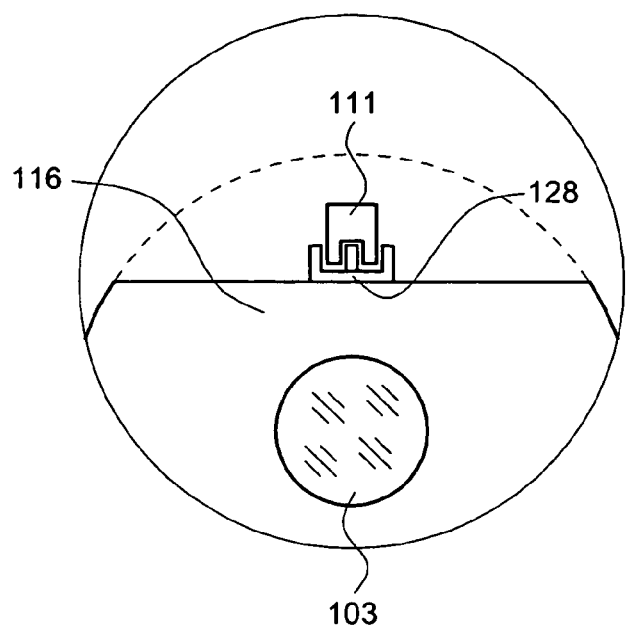
FIG. 12A is an enlarged view of a portion of the lens guiding frame near the optical sensor.

FIG. 12A is an enlarged view of a portion of the lens guiding frame near the optical sensor. The detection target member 128 provided in the lens guiding frame 116 is lowered near the outer periphery of the zoom lens 103, depending on the outer diameter of the zoom lens 103. At this time, the optical sensor 111 is also lowered to a position corresponding to the detection target member 128. Therefore, the optical sensor 111 and the detection target member 128 can be disposed within the outer diameter of the lens guiding frame 116, shown in FIG. 2.

Figure 12B:
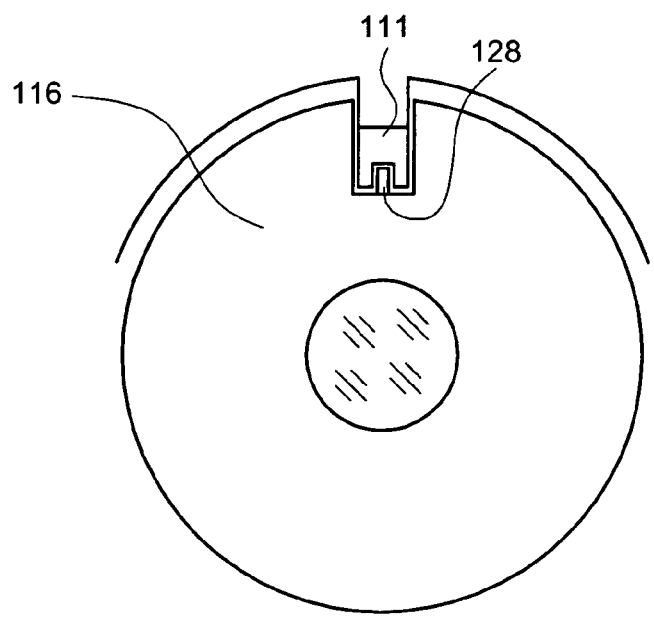
FIG. 12B is an enlarged view of a portion of the lens guiding frame near the optical sensor.

FIG. 12B is an enlarged view of the lens guiding frame near the optical sensor. The detection target member 128 provided in the lens guiding frame 116 is provided on the outer peripheral edge of the lens guiding frame 116 in the direction of the optical axis LA, and the optical sensor 111 is also similarly disposed in a position on the outer peripheral edge of the lens guiding frame 116. As a result, the optical sensor 111 and the detection target member 128 can be disposed within the outer peripheral edge of the lens guiding frame 116.

By disposing the optical sensor 111 and the detection target member 128 inside the outer diameter (outer peripheral edge) of the lens guiding frame 116, an overall size of the lens guiding frame 116 can be reduced and the shape can be simplified. Therefore, a size and shape of an internal space of the main unit 114 (see FIG. 1) can be reduced and simplified accordingly. As a result, the lens tube 100 can be miniaturized.

As explained above, in the position detecting device and the lens tube 100 including the position detecting device according to the embodiment, when the zoom lens 103 is in the home position, the sensor cover 402 of the detection target member 128 covers the sensor light emitting unit 301 and the sensor light receiving unit 302 of the optical sensor 111, thereby preventing the extraneous light from being incident on the sensor light receiving unit 302 of the optical sensor 111. Therefore, the erroneous detection can be effectively prevented when the optical sensor 111 performs the position detection of the zoom lens 103 and the like, and an accurate position of the zoom lens 103 can be detected.

In addition, the position detection of the zoom lens 103 is performed by the detection target member 128 and the optical sensor 111. The detection target member 128 is integrally molded with the lens guiding frame 116. Therefore, the position detection device can be actualized with a simpler structure. The structure in the main unit 114 can be simplified and the position detecting device can be disposed more freely. As a result, operations when manufacturing the lens tube 100 can be simplified, and operation costs can be reduced.

Furthermore, the optical sensor 111 and the detection target member 128 can be disposed to be positioned within the outer diameter of the lens guiding frame 116. The detection target member 128 is integrally molded with the lens guiding frame 116. Therefore, for example, a relief space for the optical sensor 111 and the detection target member 128 is not required between the main unit 114 and the lens guiding frame 116, and the lens tube 100 can be miniaturized.

According to the embodiment described above, a sensor detecting unit can be configured in a simple structure. Furthermore, erroneous detections can be prevented, and overall miniaturization can be achieved.

Although the invention has been described with respect to a specific embodiment for a complete and clear disclosure, the appended claims are not to be thus limited but are to be construed as embodying all modifications and alternative constructions that may occur to one skilled in the art which fairly fall in the basic teaching herein set forth.

The present document incorporates by reference the entire contents of Japanese priority document, 2005-314618 filed in Japan on Oct. 28, 2005.

What is claimed is:

1. A position detecting device detecting a position of a frame that holds a lens in a lens tube, the position detecting device comprising:

an optical sensor unit arranged on any one of the lens tube and the frame; and
a detection target unit arranged on either one of the lens tube and the frame on which the optical sensor unit is not arranged, the detection target unit to be detected by the optical sensor unit, wherein
the detection target unit includes
a target member detected by the optical sensor unit; and
a shielding unit configured to cover the optical sensor unit and the target member at a time of detection, wherein
the target member includes
a protrusion along the optical axis, and
the shielding unit is formed along the optical axis near the target member so as to cover an outer side of the optical sensor unit at least during the detection of the position, and includes
a pair of walls arranged to face each other in a direction perpendicular to the optical axis, sandwiching the target member; and
a bottom wall arranged on a side of a base of the target member, and configured to connect the pair of walls.

2. The position detecting device according to claim 1, wherein the shielding unit further includes a front wall configured to connect edges of the pair of walls and the bottom wall, the edges on a front side in the direction of the optical axis.

3. The position detecting device according to claim 1, wherein the shielding unit further includes a rear wall configured to connect edges of the pair of walls and the bottom wall, the edges on a rear side in the direction of the optical axis.

4. The position detecting device according to claim 1, wherein the optical sensor unit and the detection target unit are positioned inside an outer peripheral edge of the frame on a plane perpendicular to the direction of the optical axis.

5. A lens tube comprising:
a frame configured to hold a lens;
a lens tube main unit configured to hold the lens and the frame movably in a direction of an optical axis; and
a detecting unit configured to detect a position of the frame in the direction of the optical axis, wherein
the detecting unit includes
an optical sensor unit arranged on any one of the lens tube main unit and the frame; and
a detection target unit arranged on either one of the lens tube main unit and the frame on which the optical sensor unit is not arranged, the detection target unit to be detected by the optical sensor unit, and including
a target member detected by the optical sensor unit; and
a shielding unit configured to cover the optical sensor unit and the target member at a time of detection, wherein
the target member includes
a protrusion along the optical axis, and
the shielding unit is formed along the optical axis near the target member so as to cover an outer side of the optical sensor unit at least during the detection, and includes
a pair of walls arranged to face each other in a direction perpendicular to the optical axis, sandwiching the target member; and
a bottom wall arranged on a side of a base of the target member, and configured to connect the pair of walls.

6. The lens tube according to claim 5, further comprising a driving unit configured to drive the frame to a predetermined position in the direction of the optical axis, based on position information obtained by detecting the detection target unit.

* * * * *